US011061246B2

(12) United States Patent
Sue (10) Patent No.: US 11,061,246 B2
(45) Date of Patent: Jul. 13, 2021

(54) LASER POINTER WITH SHAKE CORRECTION MECHANISM

(71) Applicant: NIDEC SANKYO CORPORATION, Nagano (JP)

(72) Inventor: Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 225 days.

(21) Appl. No.: 16/285,350

(22) Filed: Feb. 26, 2019

(65) Prior Publication Data
US 2019/0265502 A1    Aug. 29, 2019

(30) Foreign Application Priority Data
Feb. 27, 2018  (JP) .............................. JP2018-033358

(51) Int. Cl.
G02B 27/64   (2006.01)
G02B 27/20   (2006.01)

(52) U.S. Cl.
CPC ........... *G02B 27/646* (2013.01); *G02B 27/20* (2013.01)

(58) Field of Classification Search
CPC ......... G02B 27/646; G02B 27/20; G03B 5/00
See application file for complete search history.

(56) References Cited

U.S. PATENT DOCUMENTS

| 2011/0167656 | A1* | 7/2011 | Huang | ................... H01S 5/005 33/286 |
| 2016/0231641 | A1* | 8/2016 | Minamisawa | ..... H04N 5/23258 |

FOREIGN PATENT DOCUMENTS

| JP | 11085007 A | 3/1999 |
| JP | 3071151 U | 6/2000 |

* cited by examiner

*Primary Examiner* — Robert E. Tallman
(74) *Attorney, Agent, or Firm* — Cantor Colburn LLP (57) ABSTRACT

A laser pointer may include a laser beam emission unit to emit a laser beam; a housing; a shake detection sensor; a shake correction mechanism to change a direction of the laser beam, and a movable member including an accommodation portion arranged to face a window formed in one surface of the fixed body. The shake detection sensor is housed in the movable member, the fixed body, or the housing. The shake correction mechanism may include an attachment adjusting member housed together with the laser beam emission unit in the accommodation portion while surrounding a side periphery of the laser beam emission unit; a movable member support mechanism; and a movable member drive mechanism.

9 Claims, 6 Drawing Sheets

LASER POINTER WITH SHAKE CORRECTION MECHANISM

CROSS REFERENCE TO RELATED APPLICATION

The present application claims priority under 35 U.S.C. § 119 to Japanese Application No. 2018-033358 filed Feb. 27, 2018, the entire content of which is incorporated herein by reference.

BACKGROUND

At least an embodiment of the present invention relates to a laser pointer configured to emit a laser beam to a target and generate a luminous point on the target and to indicate a predetermined location of the target by the luminous point, and in particular to a laser pointer with a shake correction mechanism-equipped laser pointer with a shake correction mechanism configured to prevent fluctuations of the luminous point due to hand shake.

For example, Japanese Unexamined Patent Application Publication No. 11-85007 describes this kind of conventional laser pointer with a shake correction mechanism. The laser pointer includes a piezoelectric element configured to change the orientation of a laser oscillator and change the direction of a laser beam. When hand shaking is detected by an angle detection means, a signal processing means change the orientation of the laser oscillator by the piezoelectric element in accordance with the detected hand shaking. Therefore, beam flickers of the laser beam due to the hand shaking are offset.

Also, a conventional laser pointer with a shake correction mechanism is described in Japanese Registered Utility Model No. 3071151. The laser pointer is configured such that a laser beam source with a weight is housed in an oil bath. The size of the weight is set such that the integrated specific gravity of the laser beam source and the weight is substantially equal to the specific gravity of oil having a moderate viscosity in the oil bath. Even when the laser pointer vibrates due to hand shaking, the hand shaking is not transferred to the laser beam source in the oil bath and thus a laser point on a screen does not flicker.

However, the foregoing conventional laser pointer with a shake correction mechanism described in Japanese Unexamined Patent Application Publication No. 11-85007 is configured such that the laser oscillator is shifted by the use of distortion of the piezoelectric element and thereby the orientation of the laser oscillator is changed. Therefore, a correction range allowing the orientation to be changed is limited. Also, the laser pointer with a shake correction mechanism described in Japanese Registered Utility Model No. 3071151 is configured such that the oil viscosity in the oil bath is utilized to absorb the vibration applied to the laser beam source. Therefore, the vibration greatness that can be absorbed is limited. Consequently, when large hand shakes are applied to the foregoing conventional shake correction mechanism-equipped laser pointers, any of the laser pointers may have difficulty correcting the shakes.

SUMMARY

At least an embodiment of the present invention is made to solve such a problem. A laser pointer with a shake correction mechanism according to at least an embodiment of the present invention includes: a laser beam emission unit configured to emit a laser beam; a housing adapted to house the laser beam emission unit; a shake detection sensor configured to detect shakes applied to the housing; and a shake correction mechanism configured to change a direction of the laser beam emitted from the laser beam emission unit so that the shakes detected by the shake detection sensor are offset. The laser beam emission unit and the shake correction mechanism are housed in a fixed body accommodated in the housing. The laser pointer is provided with a movable member including an accommodation portion arranged to face a window formed in one surface of the fixed body. The movable member is housed in the fixed body. The shake detection sensor is housed in the movable member, the fixed body, or the housing. The shake correction mechanism includes:

an attachment adjusting member housed together with the laser beam emission unit in the accommodation portion while surrounding a side periphery of the laser beam emission unit, the attachment adjusting member allowing the laser beam emission unit to emit the laser beam through the window; a movable member support mechanism supporting the movable member so that the movable member is swingable with respect to the fixed body about two directions intersecting with an optical axis direction of the laser beam emitted from the laser beam emission unit; and a movable member drive mechanism configured to drive the movable member about the two directions by a coil provided on an outer periphery of the movable member and a magnet provided on an inner periphery of the fixed body opposed to the outer periphery and to offset the shakes detected by the shake detection sensor.

With this configuration, the movable member is swingably supported by the movable member support mechanism with respect to the fixed body about the two directions intersecting with the optical axis direction of the laser beam. In addition, the movable member is driven by the movable member drive mechanism about the two directions to offset shakes detected by the shake detection sensor. Therefore, shakes applied to the laser beam emission unit housed in the accommodation portion of the movable member are offset. Consequently, the direction of the laser beam emitted from the laser beam emission unit through the window formed in one surface of the fixed body is inhibited from fluctuating. As a result, a luminous point generated on a target by irradiation of the laser beam on the target is inhibited from flickering by hand shaking. Such a shake correction can be made in accordance with a range in which the movable member is swingably supported by the movable member support mechanism with respect to the fixed body. Therefore, large hand shakes can be more corrected compared with the conventional laser pointer described in Japanese Unexamined Patent Application Publication No. 11-85007 and configured such that the laser oscillator is shifted by the piezoelectric element and thereby hand shaking is corrected or compared with the conventional laser pointer described in Japanese Registered Utility Model No. 3071151 and configured to utilize oil as a buffer and inhibit shaking from being applied to the laser beam source.

Further, the laser beam emission unit is housed in the accommodation portion of the movable member in a state where the side periphery of the laser beam emission unit is covered by the attachment adjusting member. Therefore, the attachment adjusting member is replaced and thereby plural types of laser beam emission unit can be attached to the movable member without modification of components other than the attachment adjusting member. Unlike with the foregoing configuration, in a configuration where the laser beam emission unit is directly housed in the accommodation portion without the attachment adjusting member, if the laser beam emission unit has a small outer diameter, the inner diameter of the accommodation portion is reduced in accordance with the outer diameter. Accordingly, the shake correction mechanism configured to surround the outer periphery of the accommodation portion is reduced in size. Therefore, the shake correction mechanism is downsized; however, the long side of the coil configured to generate drive torque in a magnetic field formed by the magnet cannot secure a sufficient length. Consequently, torque sufficient for driving the movable member by the shake correction mechanism cannot be generated. However, with the foregoing configuration, the laser beam emission unit is housed in the accommodation portion in a state where the attachment adjusting member is interposed between the laser beam emission unit and the accommodation portion. Therefore, the size of the shake correction mechanism configured to surround the accommodation portion can be secured. As a result, a configuration can be provided in which torque sufficient for driving the movable member by the coil and the magnet, which configure the shake correction mechanism, is easily generated.

Also, according to at least an embodiment of the present invention, the movable member support mechanism is configured to support the movable member so that the movable member is swingable about a first axis line that intersects with the optical axis direction of the laser beam emitted from the laser beam emission unit and about a second axis line that intersects with the optical axis direction and the first axis line. The movable member support mechanism includes a movable frame having a first corner portion and a third corner portion that are separated in a direction along the first axis line, and a second corner portion and a fourth corner portion that are separated in a direction along the second axis line. The first corner portion and the third corner portion of the movable frame are swingably supported by the fixed body, and the second corner portion and the fourth corner portion of the movable frame support the movable member so that the movable member is swingable.

With this configuration, the movable frame is configured such that the first corner portion and the third corner portion separated in the direction along the first axis line are swingably supported with respect to the fixed body about the first axis line and such that the movable member is swingably supported about the second axis line by the second corner portion and the fourth corner portion separated in the direction along the second axis line. Therefore, the movable member is swingably supported by the movable frame with respect to the fixed body about the first axis line and the second axis line.

Further, according to at least an embodiment of the present invention, fixed body side swing support portions are respectively configured between the first corner portion and the fixed body and between the third corner portion and the fixed body. Each of the fixed body side swing support portions includes: a protrusion provided on one of the movable frame and the fixed body; and a recessed receiving portion provided on the other of the movable frame and the fixed body to receive an end of the protrusion. Movable member side swing support portions are respectively configured between the second corner portion and the movable member and between the fourth corner portion and the movable member. Each of the movable member side swing support portions includes: a protrusion provided on one of the movable frame and the movable member; and a recessed receiving portion provided on the other of the movable frame and the movable member to receive an end of the protrusion.

With this configuration, the movable member is swingably supported about the first axis line by the fixed body side swing support portions that are respectively provided between the first corner portion of the movable frame and the fixed body and between the third corner portion of the movable frame and the fixed body and each of which is configured by the protrusion and the receiving portion. Furthermore, the movable member is swingably supported about the second axis line by the movable member side swing support portions that are respectively provided between the second corner portion and the movable member and between the fourth corner portion and the movable member and each of which is configured by the protrusion and the receiving portion.

Furthermore, according to at least an embodiment of the present invention, the center of gravity of the movable member is arranged to be aligned in the optical axis direction with the swing support center of the movable member supported by the movable member support mechanism.

The center of gravity of the movable member is supported in the optical axis direction at a position different from the swing support center of the movable member support mechanism. In such a case, swing torque is generated based on a distance between the center of gravity of the movable member and the swing support center of the movable member support mechanism. Therefore, the movable member vibrates differently from the fixed body and the vibration of the movable member is complicated. However, with the foregoing configuration, the gravity center of the movable member is supported in the optical axis L direction to be aligned with the swing support center of the movable member support mechanism and thus the above swing torque is not generated. Consequently, shake correction can be appropriately controlled such that shakes applied to the movable member are offset.

Further, according to at least an embodiment of the present invention, a first movement mechanism allowing an attachment position of the attachment adjusting member in the optical axis direction to be changed is formed on an outer periphery of the attachment adjusting member and an inner periphery of the accommodation portion surrounding the outer periphery of the attachment adjusting member.

With this configuration, the attachment position of the attachment adjusting member with respect to the accommodation portion in the optical axis direction is changed by the first movement mechanism. Therefore, a position of the movable member in the optical axis direction to which a total weight of the attachment adjusting member and the laser beam emission unit held by the attachment adjusting member is applied is changed. Depending on different types of laser beam emission unit to be housed in the accommodation portion of the movable member with the attachment adjusting member or depending on respective bodies of laser beam emission units, the gravity center of the movable member can be changed to an appropriate position.

Furthermore, according to at least an embodiment of the present invention, the first movement mechanism is formed by an external thread cut on the outer periphery of the attachment adjusting member and an internal thread cut on the inner periphery of the accommodation portion surrounding the outer periphery of the attachment adjusting member.

With this configuration, the attachment adjusting member is rotated relative to the accommodation portion and thereby the attachment position of the attachment adjusting member with respect to the accommodation portion in the optical axis direction can be easily adjusted.

Further, according to at least an embodiment of the present invention, a second movement mechanism allowing an attachment position of the laser beam emission unit in the optical axis direction to be changed is formed on an outer periphery of the laser beam emission unit and an inner periphery of the attachment adjusting member surrounding the outer periphery of the laser beam emission unit.

With this configuration, the attachment position of the laser beam emission unit with respect to the attachment adjusting member in the optical axis direction is changed by the second movement mechanism. Therefore, a position of the movable member in the optical axis direction to which the weight of the laser beam emission unit held by the attachment adjusting member is applied is changed. Depending on types of laser beam emission unit to be housed in the accommodation portion of the movable member with the attachment adjusting member or depending on respective bodies of laser beam emission units, the gravity center of the movable member can be changed to an appropriate position. Further, in a case where in addition to the second movement mechanism, the first movement mechanism is equipped, the center of gravity of the movable member can be more finely and flexibly adjusted. Therefore, the center of gravity of the movable member can be changed to a more appropriate position.

Furthermore, according to at least an embodiment of the present invention, the second movement mechanism is formed by an external thread cut on the outer periphery of the laser beam emission unit and an internal thread cut on the inner periphery of the attachment adjusting member surrounding the outer periphery of the laser beam emission unit.

With this configuration, the laser beam emission unit is rotated relative to the attachment adjusting member and thereby the attachment position of the laser beam emission unit with respect to the attachment adjusting member in the optical axis direction can be easily adjusted.

In addition, according to at least an embodiment of the present invention, a protrusion or a recessed portion is formed at an end portion of the attachment adjusting member, which is located adjacent to the window.

With this configuration, one's fingertips or a tool is placed onto the protrusion or the recessed portion at the end portion of the attachment adjusting member, which is located adjacent to the window. Thus, the attachment adjusting member is easily rotated and thereby the position thereof can be more easily adjusted.

Moreover, according to at least an embodiment of the present invention, the attachment adjusting member is made of metal.

With this configuration, heat generated at the laser beam emission unit by its operation can be quickly released by the attachment adjusting member.

According to at least an embodiment of the present invention, a laser pointer with a shake correction mechanism capable of, compared with a conventional laser pointer, correcting large hand shakes can be provided.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Next, an embodiment for carrying out a laser pointer with a shake correction mechanism according to at least an embodiment of the present invention will be described.

Overall Configuration

Figure 1:
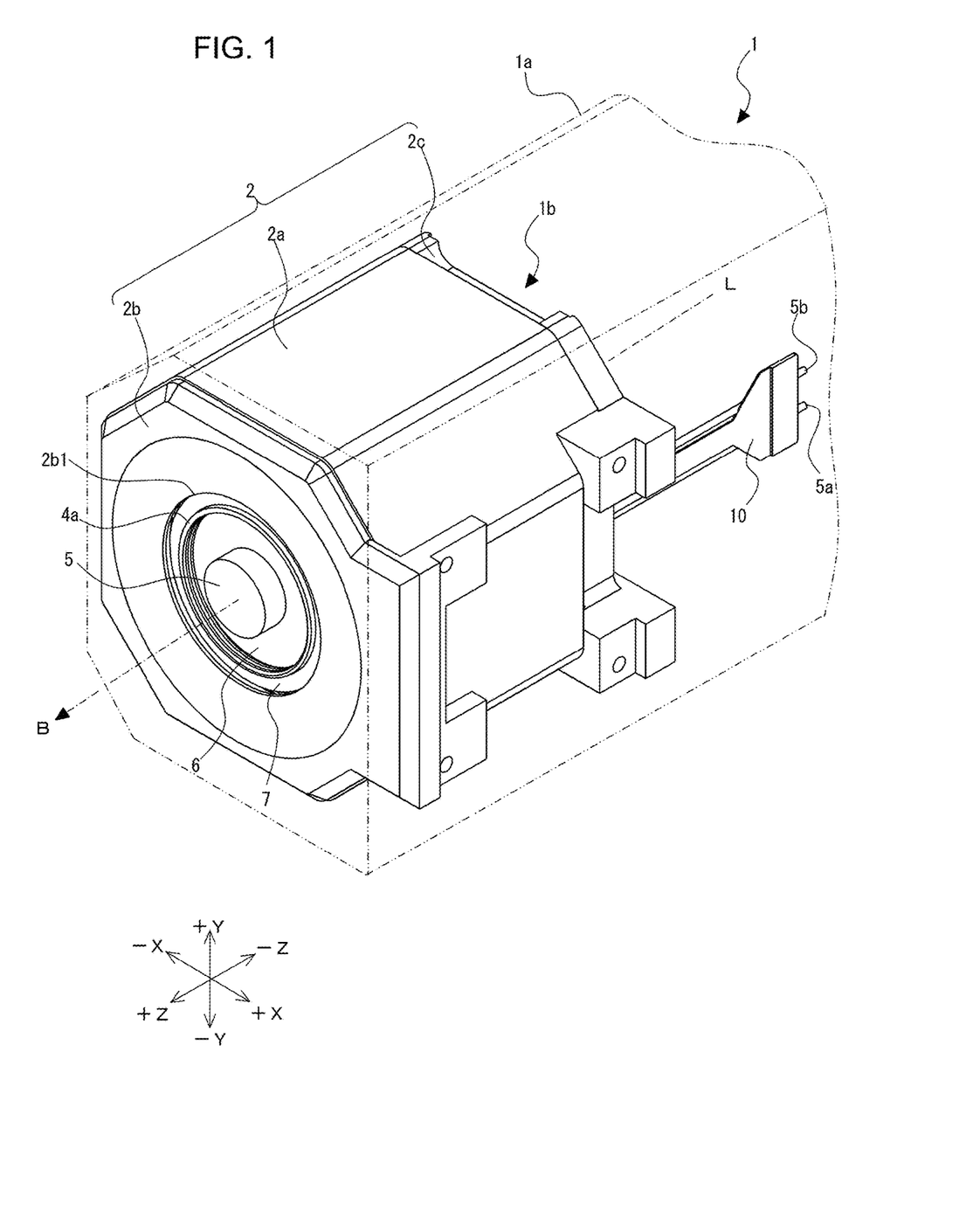
FIG. 1 is a perspective view of the outline of a laser pointer with a shake correction mechanism according to an embodiment of the present invention.
Figure 2A:
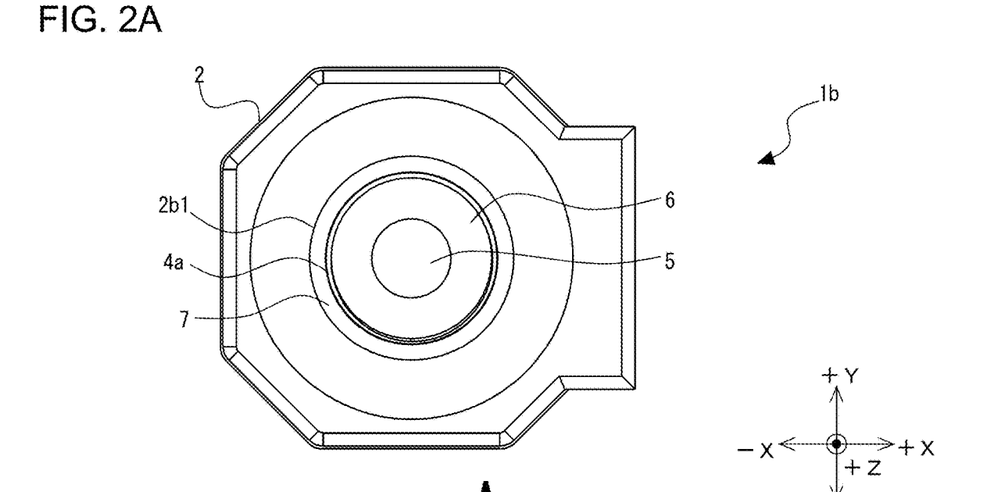
FIG. 2A and FIG. 2B are a front view and a side view of the laser pointer with a shake correction mechanism according to the embodiment of the present invention.
Figure 2B:
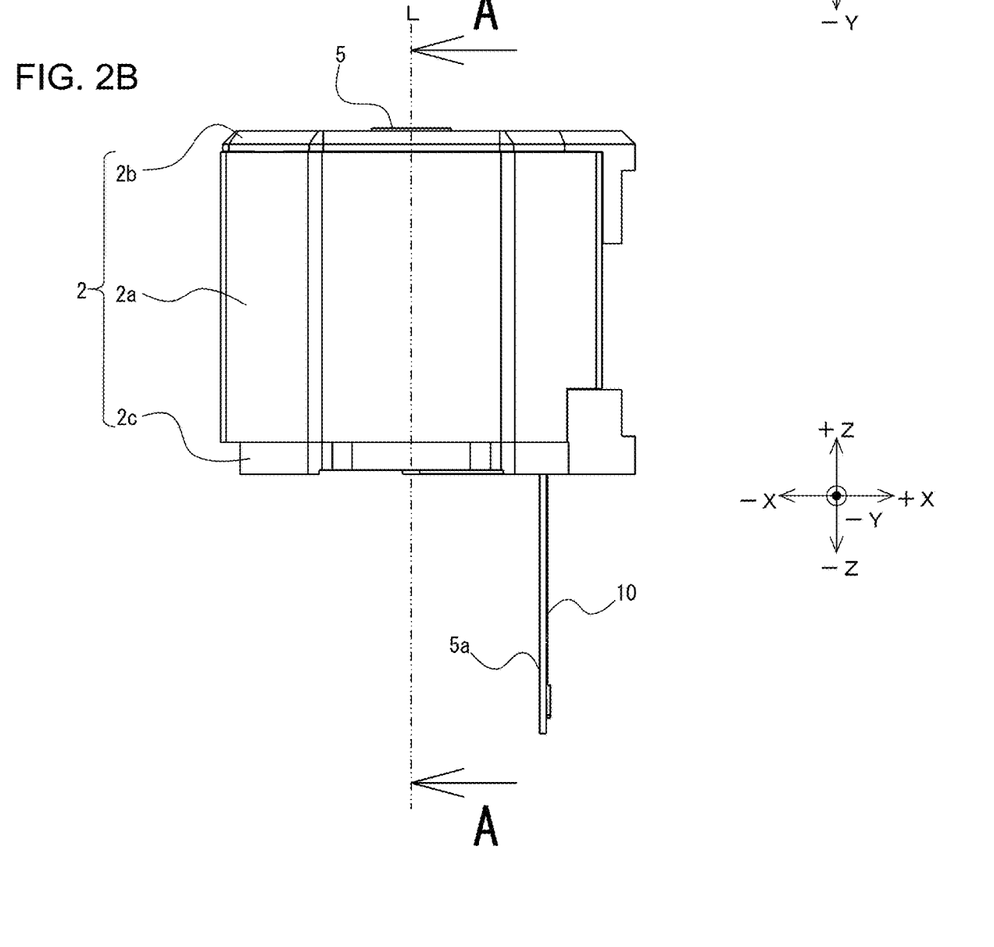
Figure 3:
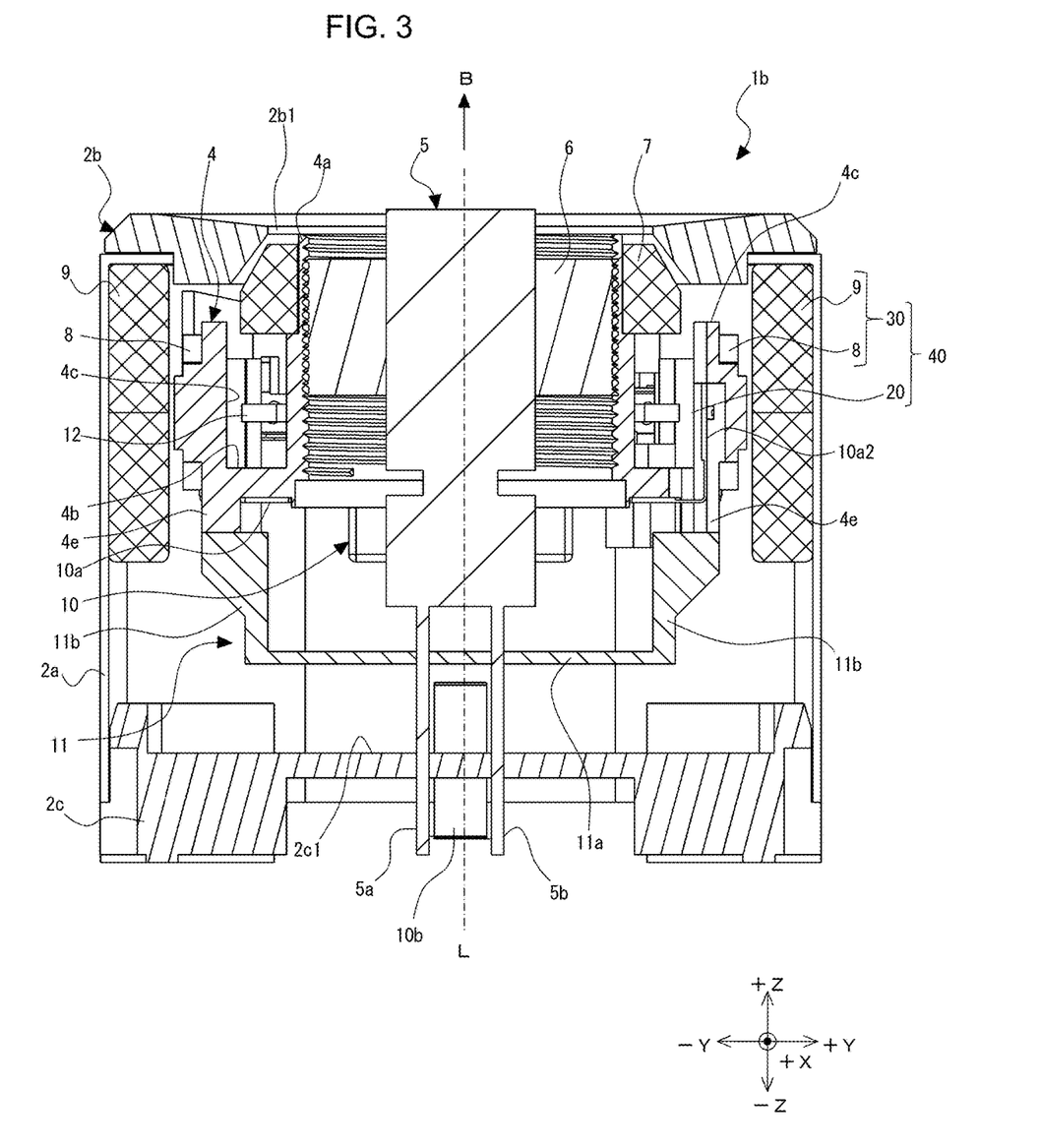
FIG. 3 is a cross-sectional view of the laser pointer with a shake correction mechanism according to the embodiment of the present invention.
Figure 4:
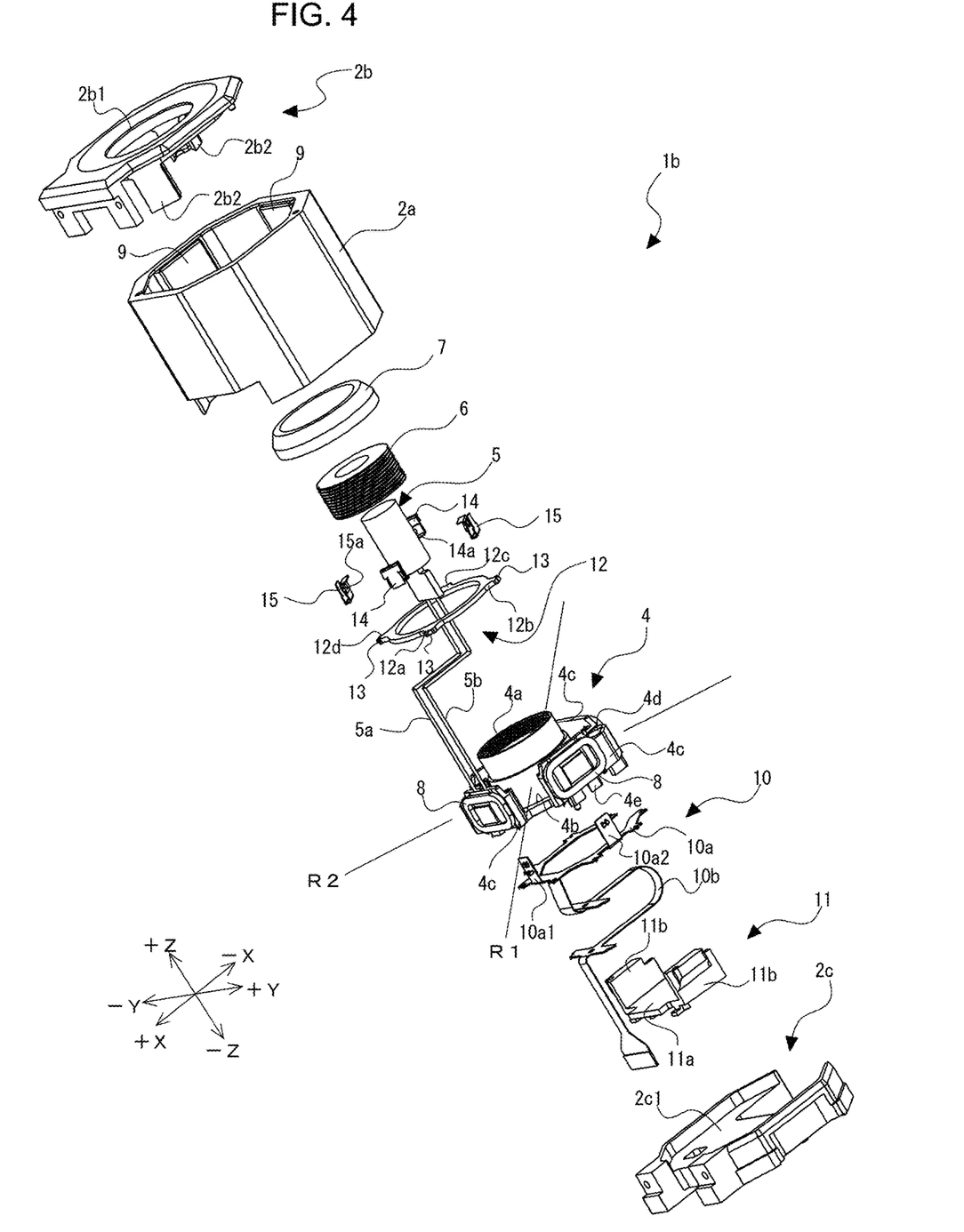
FIG. 4 is an exploded perspective view of the laser pointer with a shake correction mechanism according to the embodiment of the present invention when viewed in one direction.
Figure 5:
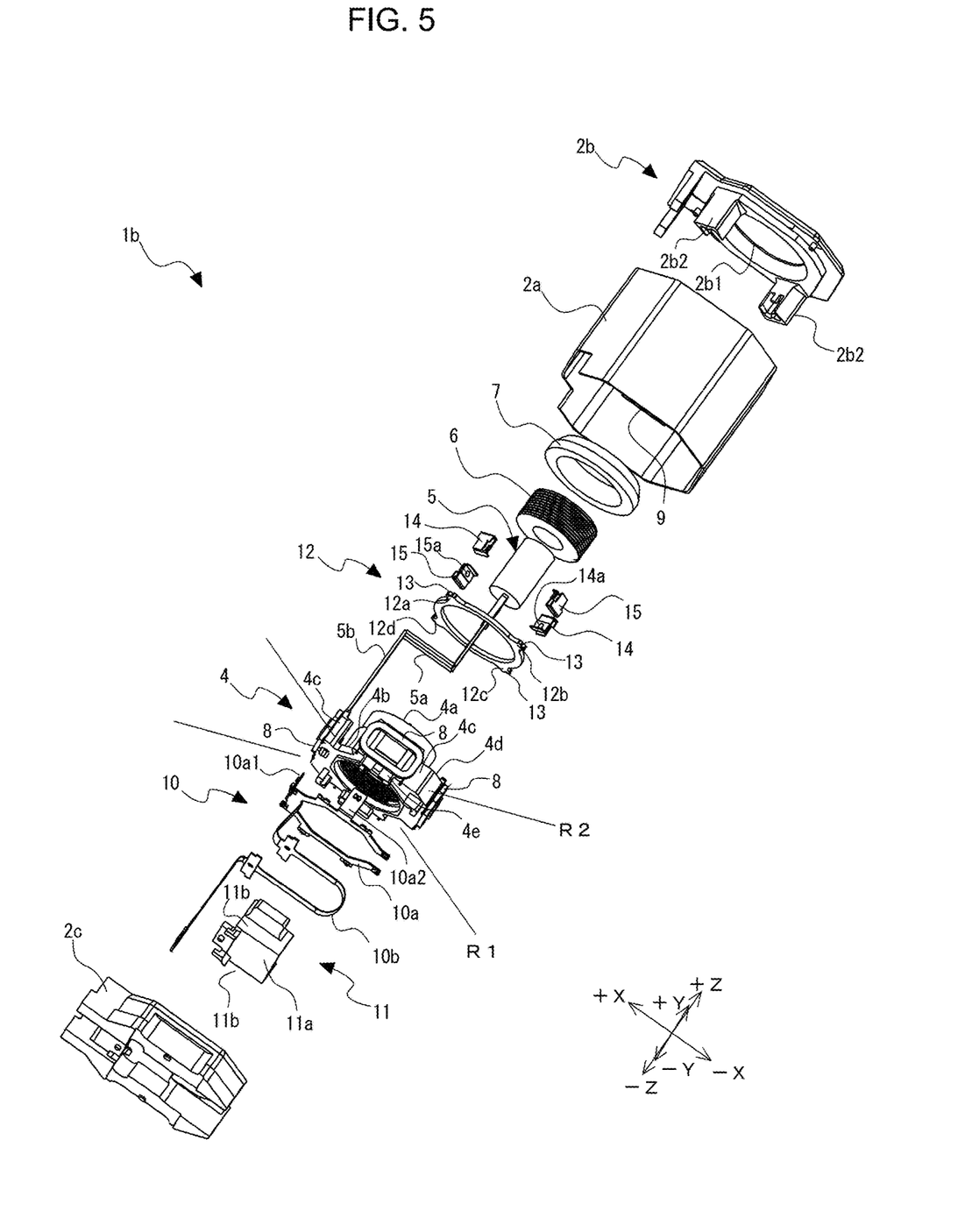
FIG. 5 is an exploded perspective view of the laser pointer with a shake correction mechanism according to the embodiment of the present invention when viewed in the other direction.

FIG. 1 is a perspective view of the outline of a laser pointer 1 with a shake correction mechanism according to an embodiment of the present invention. FIG. 2A and FIG. 2B are a front view and a side view of the laser pointer. FIG. 3 is a cross-sectional view taken along the break line A-A of the laser pointer illustrated in FIG. 2B when viewed in a direction indicated by the arrows. In addition, FIG. 4 is an exploded perspective view from the laser beam irradiated side, and FIG. 5 is an exploded perspective view from the laser beam irradiating side.

In the present specification, elements identical or similar to each other will be explained with the same reference number assigned thereto. Further, directions of three axes X, Y and Z illustrated in each drawing are orthogonal to each other. One side of the X-axis direction is indicated by +X and the other side is indicated by −X. One side of the Y-axis direction is indicated by +Y and the other side is indicated by −Y. One side of the Z-axis direction is indicated by +Z and the other side is indicated by −Z. The Z-axis direction is a direction along an optical axis L of a laser beam emitted from a laser module 5 housed in a movable member 3 of the laser pointer 1 in a state where the movable member 3 described below is not vibrating. Furthermore, the +Z side is the irradiated side in the optical axis L direction, and the −Z side is the irradiating side in the optical axis L direction.

The laser pointer 1 is configured such that a shake correction actuator 1b is housed in a housing 1a. The shake correction actuator 1b includes a fixed body 2 configured by a cylindrical case 2a, a front case 2b, and a back case 2c. The cylindrical case 2a has a substantially octagon-shaped outline and is made of a magnetic material. The front case 2b is mounted to the cylindrical case 2a from the +Z side (the irradiated side), and the back case 2c is mounted to the cylindrical case 2a from the −Z side (the irradiating side). Each of the front case 2b and the back case 2c is made of a resin material.

Figure 6A:
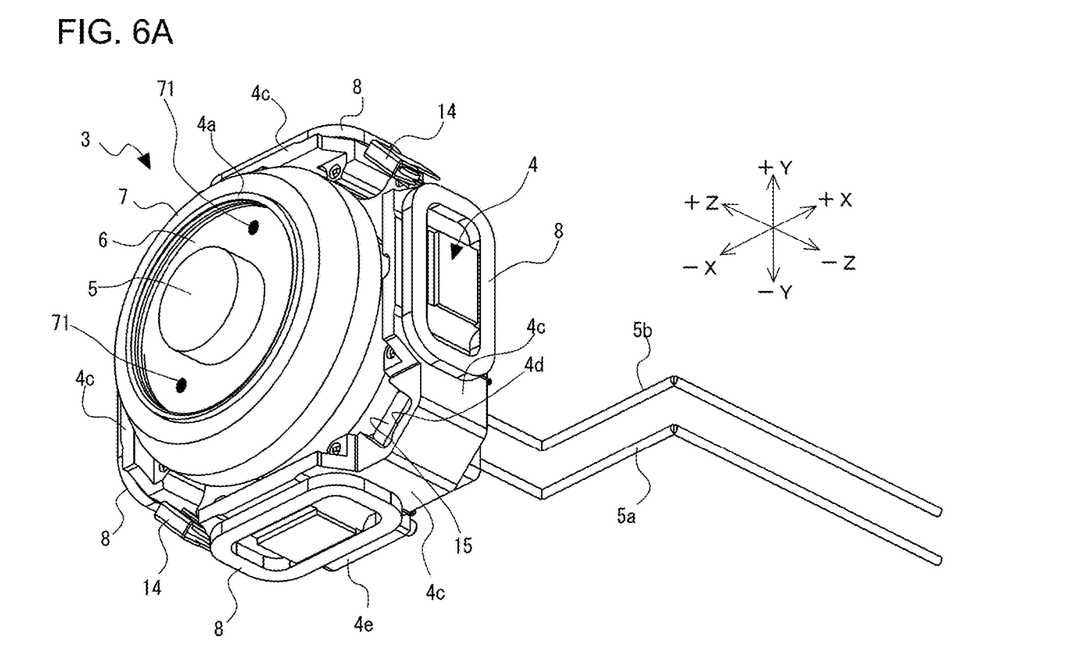
FIG. 6A is a perspective view of a movable member configuring the laser pointer with a shake correction mechanism according to the embodiment of the present invention.

The movable member 3 is housed in the fixed body 2 while being supported by an annular movable frame 12 as will be described. FIG. 6A is a perspective view illustrating the appearance of the movable member 3 from which a spacer 11 to be attached at the −Z side of a holder 4 thereto is removed. The holder 4 is made of resin and is configured such that a cylindrical portion 4a of a hollow-cylindrical shape is provided in the center of a substantially rectangle-shaped bottom plate portion 4b so as to vertically extend therefrom around the Z-axis as a central axis. The laser module 5 is housed at an inner periphery of the cylindrical portion 4a formed in the center of the holder 4 in a state where an attachment adjusting member 6 is interposed between the laser module 5 and the cylindrical portion 4a. In the embodiment, the attachment adjusting member 6 is made of metal. The cylindrical portion 4a configures an accommodation portion 80 arranged to face a window 2b1 formed in the front case 2b disposed on one surface of the fixed body 2. The laser module 5 is formed in a column shape, and two lead wires 5a, 5b are drawn out from an end portion at the −Z side of the laser module 5. The laser module 5 configures a laser beam emission unit. When a predetermined voltage is applied between the lead wires 5a, 5b, a laser beam B is emitted from an end portion at the +Z side of the laser module 5.

Attachment Structure of Laser Beam Emission Unit

Figure 6B:
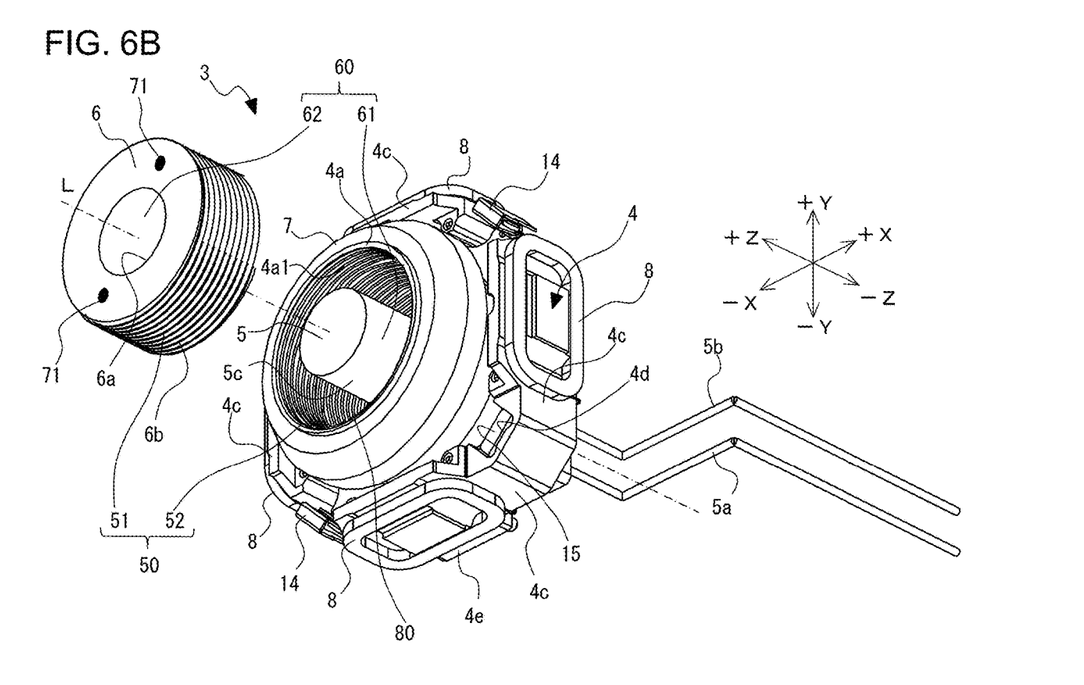
FIG. 6B is a perspective view of the movable member in a state where an attachment adjusting member is removed from the movable member illustrated in FIG. 6A.

FIG. 6B is a perspective view of the movable member 3 in a state where the attachment adjusting member 6 is removed from the movable member 3 illustrated in FIG. 6A. As illustrated in FIG. 6B, the attachment adjusting member 6 is formed in a column shape having a hollow portion. The diameter of an inner periphery 6a in the hollow portion is set at a size allowing an outer periphery 5c of the laser module 5 to fit into the attachment adjusting member 6. The diameter of an outer periphery 6b of the attachment adjusting member 6 is set at a size allowing the attachment adjusting member 6 to fit into an inner periphery 4a1 of the cylindrical portion 4a.

In the embodiment, an adhesive is applied between the inner periphery 6a of the attachment adjusting member 6 and the outer periphery 5c of the laser module 5, therefore integrally fixing the attachment adjusting member 6 to the laser module 5. Additionally, an external thread 51 is cut on the outer periphery 6b of the attachment adjusting member 6, and an internal thread 52 is cut on the inner periphery 4a1 of the cylindrical portion 4a surrounding the outer periphery 6b of the attachment adjusting member 6. The external thread 51 of the attachment adjusting member 6 is tightened to the internal thread 52 of the inner periphery 4a1 of the cylindrical portion 4a and thereby the attachment adjusting member 6 is attached together with the laser module 5 to the movable member 3. The external thread 51 cut on the outer periphery 6b of the attachment adjusting member 6 and the internal thread 52 cut on the inner periphery 4a1 of the cylindrical portion 4a configure a first movement mechanism 50. The first movement mechanism 50 is formed on the outer periphery 6b of the attachment adjusting member 6 and the inner periphery 4a1 of the cylindrical portion 4a surrounding the outer periphery 6b, and the first movement mechanism 50 allows an attachment position of the attachment adjusting member 6 in the optical axis L direction to be changed.

The central axis of the cylindrical portion 4a is identical to the optical axis L direction of the laser beam B emitted from the laser module 5 held via the attachment adjusting member 6 by the cylindrical portion 4a. The attachment adjusting member 6 is housed together with the laser module 5 in the cylindrical portion 4a while covering a side periphery of the laser module 5, and thus the laser module 5 is configured to emit the laser beam B through the window 2b1 in the optical axis L direction. In addition, a weight 7 for adjusting the center of gravity of the movable member 3 in the optical axis L direction is fixed to an end portion at the +Z side of the cylindrical portion 4a with an adhesive.

Movable Member Drive Mechanism 30

Four wall portions 4c are provided at opposite sides in the X-axis direction and at opposite sides in the Y-axis direction on the bottom plate portion 4b of the holder 4 so as to vertically extend toward the +Z side. Swing driving coils 8 are attached respectively to outer peripheries of the four wall portions 4c. Further, swing driving magnets 9 are attached to opposite inner walls of the cylindrical case 2a in the X-axis direction and to opposite inner walls of the cylindrical case 2a in the Z-axis direction so as to face the corresponding swing driving coils 8. Furthermore, a gyroscope, a Hall sensor, or the like, not illustrated, for detecting, the amount of shaking applied through the housing 1a to the fixed body 2 is provided as a shake detection sensor in the movable member 3. The swing driving coils 8 are provided on an outer periphery of the movable member 3 in the X-axis direction and the Y-axis direction and the swing driving magnets 9 are provided on an inner periphery of the fixed body 2, which is opposed to the outer periphery of the movable member 3 in the X-axis direction and the Y-axis direction. Thus, the swing driving coils 8 and the swing driving magnets 9 configure a movable member drive mechanism 30 structured to drive the movable member 3 about a first axis line R1 and a second axis line R2, which are described below, and to offset the amount of shaking detected by the gyroscope or the like.

In the embodiment, each of the swing driving magnets 9 has an inner surface located adjacent to each of the swing driving coils 8 and an outer surface located on the opposite side of the inner surface, and the inner surface and the outer surface of the swing driving magnet 9 are magnetized to different magnetic poles. In addition, the swing driving magnet 9 is divided into two magnets in the optical axis L direction, and the two magnets at the +Z side and the −Z side have respective portions which are disposed on the inner surface adjacent to the swing driving coil 8 and which are magnetized to different magnetic poles. Therefore, by the action of a magnetic field of the swing driving magnet 9 on the swing driving coil 8, the force acting in the same direction in accordance to the Fleming's rule is applied into an electric current flowing along each of the long sides of the swing driving coil 8, and the force acting in the opposite direction is applied into an electric current flowing along each of the short sides of the swing driving coil 8. Accordingly, the forces are offset each other. As a result, each of the long sides of the swing driving coil 8 is utilized as an effective side that applies torque to the movable member 3 and thus shake correction is performed.

Further, the movable member drive mechanism 30 may be configured such that the swing driving coils 8 are provided on the cylindrical case 2a and that the swing driving magnets 9 are provided on the holder 4. Furthermore, a gyroscope may be provided not only in the movable member 3 but in the fixed body 2 or the housing 1a. The amount of shaking applied to the fixed body 2 or the housing 1a may be detected by the gyroscope, and the amount of shaking may be detected by a Hall element mounted in the movable member 3.

The bottom plate portion 4b of the holder 4 has a bottom surface located at the −Z side and provided with a rectangular frame portion 10a of a flexible wiring substrate 10. The rectangular frame portion 10a is provided in contact with the bottom surface at the −Z side while extending along an outer periphery of the bottom surface. A band-shaped routing wiring portion 10b is drawn out from the rectangular frame portion 10a. The rectangular frame portion 10a includes a first standing portion 10a1 (see FIG. 4 and FIG. 5) protruding toward the +Z side, and a Hall element configured to detect the amount of shaking around the Y-axis or a thermistor configured to detect the amount of change in temperature is connected to the first standing portion 10a1. The rectangular frame portion 10a includes a second standing portion 10a2 (see FIG. 4 and FIG. 5), and a Hall element configured to detect the amount of shaking around the X-axis is connected to the second standing portion 10a2. The routing wiring portion 10b is bent in a U-shape along upper and lower surfaces of a bottom plate 11a of the spacer 11 and is drawn out together with the lead wires 5a, 5b of the laser module 5 from the back case 2c toward the −Z side to be connected to a control substrate, not illustrated. A drive current is supplied from the control substrate through the flexible wiring substrate 10 to the four swing driving coils 8. Therefore, the movable member 3 is driven about the first axis line R1 and the second axis line R2, which are described below, so as to offset shakes detected by the gyroscope or the like. In response to an operation of a switch, not illustrated, a control signal for laser oscillation is output from the control substrate through the lead wires 5a, 5b to the laser module 5.

Movable Member Support Mechanism 20

A gimbal mechanism is configured as a movable member support mechanism 20 between the fixed body 2 and the movable member 3. The gimbal mechanism is structured to support the movable member 3 so that the movable member 3 is swingable with respect to the fixed body 2 around the first axis line R1 and the second axis line R2 (see FIG. 4 and FIG. 5) that intersect with the optical axis L direction of the laser beam B emitted from the laser module 5. The first axis line R1 is orthogonal to the Z-axis direction as the optical axis L direction of the laser beam emitted from the laser module 5. The second axis line R2 is orthogonal to the Z-axis direction and the first axis line R1. In addition, the first axis line R1 is inclined at 45 degrees with respect to the X-axis direction and the Y-axis direction, and the second axis line R2 is inclined at 45 degrees with respect to the X-axis direction and the Y-axis direction. The foregoing movable member drive mechanism 30 and the foregoing movable member support mechanism 20 configure a shake correction mechanism 40 that is configured to change the direction of the laser beam B emitted from the laser module 5, so as to offset shakes detected by the gyroscope or the like.

The movable member support mechanism 20 includes the annular movable frame 12 that is disposed between the movable member 3 and the fixed body 2 while surrounding the outer periphery of the movable member 3. In the embodiment, when being aligned with the center of gravity of the movable member 3 in the optical axis L direction, the movable frame 12 is disposed to surround an outer periphery of the cylindrical portion 4a, which is generally located at the −Z side. The movable frame 12 is arrange such that the center of gravity of the movable member 3 is aligned with the swing support center of the movable member 3 supported by the movable member support mechanism 20 in the optical axis L direction. The movable frame 12 includes a first corner portion 12a, a second corner portion 12b, a third corner portion 12c, and a fourth corner portion 12d about the optical axis L (see FIG. 4 and FIG. 5). The first corner portion 12a and the third corner portion 12c are separated in the first axis line R1 direction. The second corner portion 12b and the fourth corner portion 12d are separated in the second axis line R2 direction. The first corner portion 12a and the third corner portion 12c of the movable frame 12 are swingably supported with respect to the fixed body 2 by two fixed body side swing support portions described below. The second corner portion 12b and the fourth corner portion 12d of the movable frame 12 support the movable member 3 so that the movable member 3 is swingable by two movable member side swing support portions described below.

The fixed body side swing support portions are respectively provided between the first corner portion 12a of the movable frame 12 and the fixed body 2 and between the third corner portion 12c of the movable frame 12 and the fixed body 2. Each of the fixed body side swing support portions includes a protrusion provided at one of the movable frame 12 and the fixed body 2 and a recessed receiving portion provided at the other of the movable frame 12 and the fixed body 2 to receive an end of the protrusion. In the embodiment, the protrusion is configured by a metallic spherical body 13 welded to each of the first corner portion 12a and the third corner portion 12c of the movable frame 12. In addition, a pair of plate-shaped springs 14 separated in first axis line R1 direction is provided and semispherical recesses 14a are formed in opposite surfaces of the plate-shaped springs 14. Each of the recesses 14a configures the recessed receiving portion. The plate-shaped springs 14 are housed in opposite enclosures of support plate-shaped portions 2b2 of the front case 2b and attached to the enclosures formed to face each other. The support plate-shaped portions 2b2 extending toward the −Z side are provided on a back surface of the front case 2b to be separated in the first axis line R1 direction. Ends of the spherical bodies 13 located at the first corner portion 12a and the third corner portion 12c and protruding radially outward of the movable frame 12 are received by the respective recesses 14a of the plate-shaped springs 14.

The movable member side swing support portions are respectively provided between the second corner portion 12b of the movable frame 12 and the movable member 3 and between the fourth corner portion 12d of the movable frame 12 and the movable member 3. Each of the movable member side swing support portions includes a protrusion provided at one of the movable frame 12 and the movable member 3 and a recessed receiving portion provided at the other of the movable frame 12 and the movable member 3. In the embodiment, the protrusion is configured by a metallic spherical body 13 welded to each of the second corner portion 12b and the fourth corner portion 12d of the movable frame 12. In addition, a pair of plate-shaped springs 15 separated in the second axis line R2 direction is provided and semispherical recesses 15a are formed in opposite surfaces of the plate-shaped springs 15. Each of the recesses 15a configures the recessed receiving portion. The plate-shaped springs 15 are housed in insertion portions 4d (see FIG. 4 and FIG. 6A-FIG. 6B) and attached to the insertion portions 4d that are located to separate from each other with respect to the cylindrical portion 4a in the second axis line R2 direction. A space surrounded from three sides of a pair of wall portions 4c of the holder 4, which are located side by side and the bottom plate portion 4b of the holder 4, thereby forming each of the insertion portions 4d. Ends of the spherical bodies 13 located at the second corner portion 12b and the fourth corner portion 12d and protruding radially outward of the movable frame 12 are received by the respective recesses 15a of the plate-shaped springs 15.

Thus, the movable frame 12 is configured such that the first corner portion 12a and the third corner portion 12c separated in the first axis line R1 direction are swingably supported with respect to the fixed body 2 about the first axis line R1 and such that the movable member 3 is swingably supported about the second axis line R2 by the second corner portion 12b and the fourth corner portion 12d separated in the second axis line R2 direction. Further, the movable member 3 is swingably supported about the first axis line R1 by the fixed body side swing support portions that are respectively provided between the first corner portion 12a of the movable frame 12 and the fixed body 2 and between the third corner portion 12c of the movable frame 12 and the fixed body 2 and each of which is configured by the protrusion and the receiving portion. Furthermore, the movable member 3 is swingably supported about the second axis line R2 by the movable member side swing support portions that are respectively provided between the second corner portion 12b and the movable member 3 and between the fourth corner portion 12d and the movable member 3 and each of which is configured by the protrusion and the receiving portion. As a result, the movable member 3 is swingably supported by the movable frame 12 with respect to the fixed body 2 about the first axis line R1 and the second axis line R2.

Further, the pair of plate-shaped springs 14 attached to the respective support plate-shaped portions 2b2 of the front case 2b is elastically deformable in the first axis line R1 direction. The pair of plate-shaped springs 15 attached to the insertion portions 4d of the holder 4 is elastically deformable in the second axis line R2 direction. Furthermore, a pair of leg portions 11b (see FIG. 4 and FIG. 5) are formed opposite to each other on opposite ends in the Y-axis direction of the spacer 11. The bottom plate 11a is interposed at the +Z side between the leg portions 11b. As illustrated in FIG. 3, upper ends of the respective leg portions 11b are fixed in a contact manner to protrusions 4e protruding from the bottom surface of the bottom plate portion 4b of the holder 4 toward the −Z side.

Function Effect

According to the laser pointer 1 of the embodiment, the movable member 3 is swingably supported by the movable member support mechanism 20 with respect to the fixed body 2 about the first axis line R1 and the second axis line R2 that intersect with the optical axis L direction of the laser beam B. In addition, the movable member 3 is driven by the movable member drive mechanism 30 about the two axes to offset shakes detected by the shake detection sensor. Therefore, shakes applied to the laser module 5 housed in the cylindrical portion 4a of the movable member 3 are offset. Consequently, the direction of the laser beam B emitted from the laser module 5 through the window 2b1 formed in one surface of the fixed body 2 is inhibited from fluctuating. As a result, a luminous point generated on a target by irradiation of the laser beam B on the target is inhibited from flickering by hand shaking. Such a shake correction can be made in accordance with a range in which the movable member 3 is swingably supported by the movable member support mechanism 20 with respect to the fixed body 2. Therefore, large hand shakes can be more corrected compared with the conventional laser pointer described in Japanese Unexamined Patent Application Publication No. 11-85007 and configured such that the laser oscillator is shifted by the piezoelectric element and thereby hand shaking is corrected or compared with the conventional laser pointer described in Japanese Registered Utility Model No. 3071151 and configured to utilize oil as a buffer and inhibit shaking from being applied to the laser beam source.

Further, the laser module 5 is housed in the cylindrical portion 4a of the movable member 3 in a state where the side periphery of the laser module 5 is covered by the attachment adjusting member 6. Therefore, the attachment adjusting member 6 is replaced and thereby plural types of laser module 5 such as laser modules of different manufacturers or different models can be attached to the movable member 3 without modification of components other than the attachment adjusting member 6. Unlike with such a configuration, in a configuration where the laser module 5 is directly housed in the cylindrical portion 4a without the attachment adjusting member 6, if the laser module 5 has a small outer diameter, the inner diameter of the cylindrical portion 4a is reduced in accordance with the outer diameter. Accordingly, the shake correction mechanism 40 configured to surround the outer periphery of the cylindrical portion 4a is reduced in size. Therefore, the shake correction mechanism 40 is downsized; however, the long side of each of the swing driving coils 8 configured to generate drive torque in a magnetic field formed by the swing driving magnets 9 cannot secure a sufficient length. Consequently, torque sufficient for driving the movable member 3 cannot be generated by the shake correction mechanism 40. However, according to the laser pointer 1 of the embodiment, the laser module 5 is housed in the accommodation portion 80 on the inner periphery of the cylindrical portion 4a of the movable member 3 in a state where the attachment adjusting member 6 is interposed between the laser module 5 and the cylindrical portion 4a. Therefore, the size of the shake correction mechanism 40 configured to surround the cylindrical portion 4a can be secured. As a result, torque sufficient for driving the movable member 3 by the swing driving coils 8 and the swing driving magnets 9, which configure the shake correction mechanism 40, is easily generated and such a configuration can be provided.

Furthermore, the movable frame 12 surrounds the cylindrical portion 4a while being disposed in the optical axis L direction at a position different from the position illustrated in FIG. 3, and the center of gravity of the movable member 3 is supported in the optical axis L direction at a position different from the swing support center of the movable member support mechanism 20. In such a case, swing torque is generated based on a distance between the center of gravity of the movable member 3 and the swing support center of the movable member support mechanism 20. Therefore, the movable member 3 vibrates differently from the fixed body 2 and the vibration of the movable member 3 is complicated. However, according to the laser pointer 1 of the embodiment, the gravity center of the movable member 3 is supported in the optical axis L direction to be aligned with the swing support center of the movable member support mechanism 20 and thus the above swing torque is not generated. Consequently, shake correction can be appropriately controlled such that shakes applied to the movable member 3 are offset.

In addition, according to the laser pointer 1 of the embodiment, the attachment position of the attachment adjusting member 6 with respect to the cylindrical portion 4a in the optical axis L direction is changed by the first movement mechanism 50 formed between the outer periphery 6b of the attachment adjusting member 6 and the inner periphery 4a1 of the cylindrical portion 4a. Accordingly, a position of the movable member 3 in the optical axis L direction to which a total weight of the attachment adjusting member 6 and the laser module 5 held by the attachment adjusting member 6 is applied is changed. Depending on different types of laser module 5 to be housed in the cylindrical portion 4a with the attachment adjusting member 6, such as laser modules of different manufacturers or different models or depending on respective bodies of laser modules 5, the gravity center of the movable member 3 can be changed to an appropriate position. Further, the first movement mechanism 50 is configured by tightening between the external thread 51 cut on the outer periphery 6b of the attachment adjusting member 6 and the internal thread 52 cut on the inner periphery 4a1 of the cylindrical portion 4a. Accordingly, the attachment adjusting member 6 is rotated relative to the cylindrical portion 4a and thereby the attachment position of the attachment adjusting member 6 with respect to the cylindrical portion 4a in the optical axis L direction can be easily adjusted.

Furthermore, according to the laser pointer 1 of the embodiment, the attachment adjusting member 6 is made of metal; therefore, heat generated at the laser module 5 by its laser oscillation can be quickly released by the attachment adjusting member 6.

Modified Example

Also, in the foregoing embodiment, a case where the inner periphery 6a of the attachment adjusting member 6 is fixed to the outer periphery 5c of the laser module 5 with an adhesive is explained. Alternatively, a second movement mechanism 60 may be formed on the outer periphery 5c of the laser module 5 and the inner periphery 6a of the attachment adjusting member 6 surrounding the outer periphery 5c of the laser module 5. The second movement mechanism 60 allows the attachment position of the laser module 5 in the optical axis L direction to be changed. Such a second movement mechanism 60 can be formed by an external thread 61 cut on the outer periphery 5c of the laser module 5 and an internal thread 62 cut on the inner periphery 6a of the attachment adjusting member 6 surrounding the outer periphery 5c of the laser module 5.

With this configuration, the attachment position of the laser module 5 with respect to the attachment adjusting member 6 in the optical axis L direction is changed by the second movement mechanism 60. Accordingly, a position of the movable member 3 in the optical axis L direction to which the weight of the laser module 5 held by the attachment adjusting member 6 is applied is changed. Depending on types of laser module 5 to be housed in the cylindrical portion 4a with the attachment adjusting member 6 or depending on respective bodies of laser modules 5, the gravity center of the movable member 3 can be changed to an appropriate position. Further, in a case where in addition to the second movement mechanism 60, the foregoing first movement mechanism 50 is equipped, the center of gravity of the movable member 3 can be more finely and flexibly adjusted. Therefore, the center of gravity of the movable member 3 can be changed to a more appropriate position. Furthermore, the second movement mechanism 60 is configured by tightening between the external thread 61 and the internal thread 62 as described above. Thus, the laser module 5 is rotated relative to the attachment adjusting member 6 and thereby the attachment position of the laser module 5 with respect to the attachment adjusting member 6 in the optical axis L direction can be easily adjusted.

In addition, the first movement mechanism 50 is configured by tightening between the external thread 51 and the internal thread 52 and the second movement mechanism 60 is configured by tightening between the external thread 61 and the internal thread 62, but not limited to such configurations. For example, protrusions are circumferentially formed on one of the inner periphery of the cylindrical portion 4a and the outer periphery of the attachment adjusting member 6 and recesses are circumferentially formed on the other of the inner periphery of the cylindrical portion 4a and the outer periphery of the attachment adjusting member 6 to configure the first movement mechanism 50 such that stepwise uneven sections are formed in the optical axis L direction. Therefore, the engagement position between the uneven sections in the optical axis L direction enables a relative position of the attachment adjusting member 6 to the cylindrical portion 4a to be adjusted. Likewise, protrusions are circumferentially formed on one of the inner periphery of the attachment adjusting member 6 and the outer periphery of the laser module 5 and recesses are circumferentially formed on the other of the inner periphery of the attachment adjusting member 6 and the outer periphery of the laser module 5 to configure the second movement mechanism 60 such that stepwise uneven sections are formed in the optical axis L direction. Therefore, the engagement position between the uneven sections in the optical axis L direction enables a relative position of the laser module 5 to the attachment adjusting member 6 to be adjusted.

Moreover, protrusions 72 protruding in the optical axis L direction or recessed portions exposed to the window 2b1 are formed at an end portion of the attachment adjusting member 6, which is located adjacent to the window 2b1. With this configuration, one's fingertips or a tool is placed onto the protrusions 71 or in the recessed portions at the end portion of the attachment adjusting member 6, which is located adjacent to the window 2b1. Thus, the attachment adjusting member 6 is easily rotated and thereby the position thereof can be more easily adjusted.

INDUSTRIAL APPLICABILITY

A laser pointer with a shake correction mechanism according to at least an embodiment of the present invention is useful for a case where a presentation is performed in front of an audience while a presenter is pointing out, with a luminous point of a laser beam, a desired location of an image projected onto a screen or the like. Even when large shakes of fingertips of the presenter holding the laser pointer are transmitted to the laser pointer, flickers of the luminous pointer are reduced and thereby the presenter can focus on the presentation.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A laser pointer comprising:
   a laser beam emission unit configured to emit a laser beam;
   a housing structured to house the laser beam emission unit;
   a shake detection sensor configured to detect shakes applied to the housing;
   a shake correction mechanism configured to change a direction of the laser beam emitted from the laser beam emission unit so that the shakes detected by the shake detection sensor are offset, wherein the laser beam emission unit and the shake correction mechanism are housed in a fixed body accommodated in the housing, and a movable member comprising an accommodation portion arranged to face a window formed in one surface of the fixed body, the movable member being housed in the fixed body, wherein the shake detection sensor is housed in the movable member, the fixed body, or the housing, the shake correction mechanism comprises:
an attachment adjusting member housed together with the laser beam emission unit in the accommodation portion while surrounding a side periphery of the laser beam emission unit, the attachment adjusting member being structured such that the laser beam emission unit emits the laser beam through the window;

a movable member support mechanism supporting the movable member so that the movable member is swingable with respect to the fixed body about two directions intersecting with an optical axis direction of the laser beam emitted from the laser beam emission unit; and a movable member drive mechanism configured to drive the movable member about the two directions by a coil provided on an outer periphery of the movable member and a magnet provided on an inner periphery of the fixed body opposed to the outer periphery and to offset the shakes detected by the shake detection sensor, a first movement mechanism allowing an attachment position of the attachment adjusting member in the optical axis direction to be changed is formed on an outer periphery of the attachment adjusting member and an inner periphery of the accommodation portion surrounding the outer periphery of the attachment adjusting member, and the first movement mechanism comprises an external thread cut on the outer periphery of the attachment adjusting member and an internal thread cut on the inner periphery of the accommodation portion surrounding the outer periphery of the attachment adjusting member.

2. The laser pointer with a shake correction mechanism according to claim 1, wherein the movable member support mechanism is configured to support the movable member so that the movable member is swingable about a first axis line that intersects with the optical axis direction of the laser beam emitted from the laser beam emission unit and about a second axis line that intersects with the optical axis direction and the first axis line, the movable member support mechanism comprising a movable frame having a first corner portion and a third corner portion that are separated in a direction along the first axis line, and a second corner portion and a fourth corner portion that are separated in a direction along the second axis line, and the first corner portion and the third corner portion of the movable frame are swingably supported by the fixed body, and the second corner portion and the fourth corner portion of the movable frame support the movable member so that the movable member is swingable.

3. The laser pointer with a shake correction mechanism according to claim 2, wherein fixed body side swing support portions are respectively configured between the first corner portion and the fixed body and between the third corner portion and the fixed body, and each of the fixed body side swing support portions comprises: a protrusion provided on one of the movable frame and the fixed body; and a recessed receiving portion provided on the other of the movable frame and the fixed body to receive an end of the protrusion, and movable member side swing support portions are respectively configured between the second corner portion and the movable member and between the fourth corner portion and the movable member, and each of the movable member side swing support portions comprises: a protrusion provided on one of the movable frame and the movable member; and a recessed receiving portion provided on the other of the movable frame and the movable member to receive an end of the protrusion.

4. The laser pointer with a shake correction mechanism according to claim 3, wherein the center of gravity of the movable member is arranged to be aligned in the optical axis direction with the swing support center of the movable member supported by the movable member support mechanism.

5. A laser pointer comprising:
a laser beam emission unit configured to emit a laser beam;

a housing structured to house the laser beam emission unit;

a shake detection sensor configured to detect shakes applied to the housing;

a shake correction mechanism configured to change a direction of the laser beam emitted from the laser beam emission unit so that the shakes detected by the shake detection sensor are offset, wherein the laser beam emission unit and the shake correction mechanism are housed in a fixed body accommodated in the housing, and a moveable member comprising an accommodation portion arranged to face a window formed in one surface of the fixed body, the moveable member being housed in the fixed body, wherein the shake detection sensor is housed in the moveable member, the fixed body, or the housing, the shake correction mechanism comprises:
an attachment adjusting member housed together with the laser beam emission unit in the accommodation portion while surrounding a side periphery of the laser beam emission unit, the attachment adjusting member being structured such that the laser beam emission unit emits the laser beam through the window;

a movable member support mechanism supporting the movable member so that the moveable member is swingable with respect to the fixed body about two directions intersecting with an optical axis direction of the laser beam emitted from the laser beam emission unit; and a moveable member drive mechanism configured to drive the moveable member about the two directions by a coil provided on and outer periphery of the moveable member and a magnet provided on an inner periphery of the fixed body opposed to the outer periphery and to offset the shakes detected by the shake detection sensor, and a second movement mechanism allowing an attachment position of the laser beam emission unit in the optical axis direction to be changed is formed on an outer periphery of the laser beam emission unit and an inner periphery of the attachment adjusting member surrounding the outer periphery of the laser beam emission unit.

6. The laser pointer with a shake correction mechanism according to claim 5, wherein the second movement mechanism comprises an external thread cut on the outer periphery of the laser beam emission unit and an internal thread cut on the inner periphery of the attachment adjusting member surrounding the outer periphery of the laser beam emission unit.

7. The laser pointer with a shake correction mechanism according to claim 1, wherein a protrusion or a recessed portion is formed at an end portion of the attachment adjusting member, which is located adjacent to the window.

8. The laser pointer with a shake correction mechanism according to claim 1, wherein the attachment adjusting member is made of metal.

9. The laser pointer with a shake correction mechanism according to claim 1, wherein the center of gravity of the movable member is arranged to be aligned in the optical axis direction with the swing support center of the movable member supported by the movable member support mechanism.

* * * * *